United States Patent

[11] 3,618,006

[72] Inventor Charles P. Wright
 Seattle, Wash.
[21] Appl. No. 557,103
[22] Filed June 13, 1966
[45] Patented Nov. 2, 1971
[73] Assignee The Boeing Company
 Seattle, Wash.

[54] FLUSH-MOUNTED TRANSDUCER ARRAY SONAR SYSTEM
 3 Claims, 4 Drawing Figs.
[52] U.S. Cl. .................................... 340/3 R,
 114/66.5 R, 340/6 R, 340/8 S, 340/9
[51] Int. Cl. ...................................... G01s 9/68,
 G01s 3/00
[50] Field of Search ........................... 114/66.5;
 340/3, 6, 8, 9, 10, 11, 8 S

[56] References Cited
UNITED STATES PATENTS
3,409,869 11/1968 McCool et al. ............... 340/9

Primary Examiner—Richard A. Farley
Attorney—Christensen, Sanborn & Matthews

CLAIM: 1. In a high-speed watercraft having an immersed generally horizontal bottom surface, a sonar system including an array of electroacoustic transducers mounted in substantially horizontal coplanar relationship imposed on an area of said surface, with said transducers emplaced in orderly arrangement of substantially parallel rows which extend transversely to other substantially parallel rows, and with the successive transducers in said rows being at approximately quarter-wavelength spacings, energy transfer means, and beam-forming circuit means operable to connect said individual transducers to said energy transfer means through predetermined different amounts of electrical delay so as to produce a directional pattern in the operation of said array, and to vary the amounts of delay so as to vary the angular direction of said pattern.

PATENTED NOV 2 1971 3,618,006

INVENTOR.
CHARLES P. WRIGHT
BY
Christensen, Sanborn & Matthews
ATTORNEYS

FLUSH-MOUNTED TRANSDUCER ARRAY SONAR SYSTEM

This invention relates to search-type sonar systems suitable for high-speed watercraft. While subject to modifications and changes, the invention is herein illustratively described by reference to its presently preferred embodiment as applied to hydrofoil craft.

Conventional search sonar transducer arrays are bulky if designed for adequate power-handling capacity and directivity. A conventional cylindrical array as currently used on naval vessels, for example, is of the order of 10 feet in height and 16 feet in diameter. An alternative transducer is a mechanically scanned flat piezoelectric disk in a streamlined housing. In either case hydrodynamic drag is high and self-noise due to flow of water around the blunt form of the housing tends to obscure signals at speeds in excess of 10 knots or so. With hydrofoils designed to operate at 25 knots and higher, the need for a completely different approach to sonar transducer system design has become evident. Moreover, at such speeds a sensitive search sonar is vital to the safety and usefulness of the craft.

Such a system should be capable of effective operation during both the hull-borne and the foil-borne phases. Versatility permitting sensitive long-range search coverage of a forward sector and sometimes the area completely surrounding and lying beneath the vessel is desirable.

A broad object of this invention is to fulfill these purposes, and more particularly to do so without adding appreciably to the hydrodynamic drag of the vessel, to its weight or bulk, or to its complexities of construction. More particularly, it is an object hereof to devise a search-type sonar having a transducer means so arranged and mounted in or upon the hydrofoil itself as to remain operatively positioned in all phases of hydrofoil craft operation, and which, more specifically, may be incorporated directly in the skin or surface of the hydrofoil at such a location that it does not interfere with structural components thereof, nor does its presence or location create self-noise nor make it unduly susceptible to water noise generated by motion of the hydrofoil. A related object is to provide such a transducer array wherein electrical and acoustical coupling between elements are minimum and wherein systematic rapid scan may be performed electrically at any desired speed and through any desired search sector or sectors.

A further object is to so locate the sonar array in the hydrofoil as to achieve any desired beam-directing "aperture" or gain of the composite array in all directions of scan without requiring that the hydrofoil structure itself be of abnormal form or size to accommodate the array.

By means of this invention sonar installation costs are reduced and factory preassembly and testing of parts for electrical integrity and physical tolerances are conveniently possible.

In accordance with this invention a flat matrix array of parallel rows and columns of individual transducer elements, conveniently in the form of thin, round flat disks of barium titanate or other piezoelectric material is mounted on the bottom surface of the hydrofoil so that all of the transducer elements face downwardly in a substantially horizontal plane. Individually energizable, the transducer elements are spaced on centers approximately one-quarter wavelength apart (i.e., between approximately one-eighth and one-half wavelength), and by appropriately phasing or delaying the energy applied to or derived from combinations of these individual transducer elements relatively the gain of the resultant beam pattern is determined and the direction of its control axis may be controlled and varied so as to produce search scan of any desired region in azimuth and also in elevation if desired. By employing a sufficiently large number of these transducer elements arranged to cover a generally circular area, azimuth scan may be effectuated in substantially continuous manner without material change of beam pattern or gain as azimuth angle changes. Being mounted substantially flush with the generally horizontal bottom face of the hydrofoil, turbulence and pressure changes in the water flowing past the array elements are minimum, so that water noise entering the receiver is greatly reduced below that experienced with conventional sonars, while hydrodynamic drag is not increased at all by the sonar.

Figure 1:
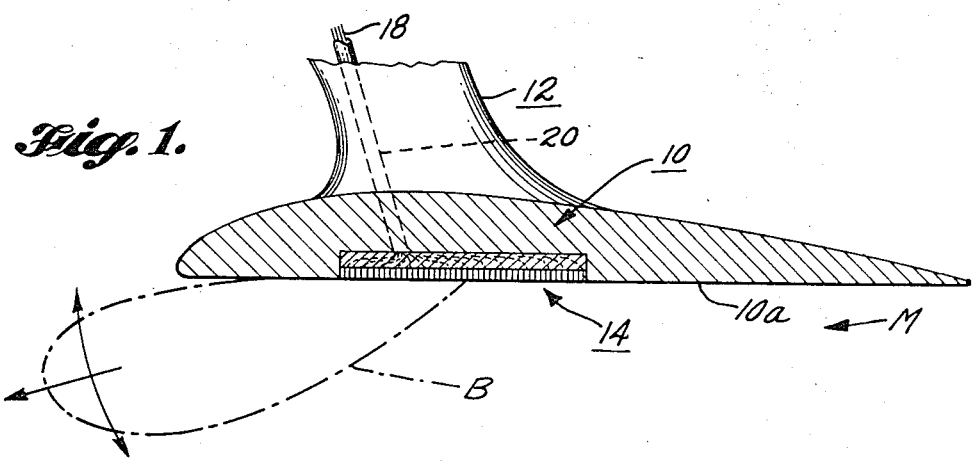
FIG. 1 is a simplified side elevation view showing a hydrofoil vane with a transducer array mounted thereon.
Figure 2:
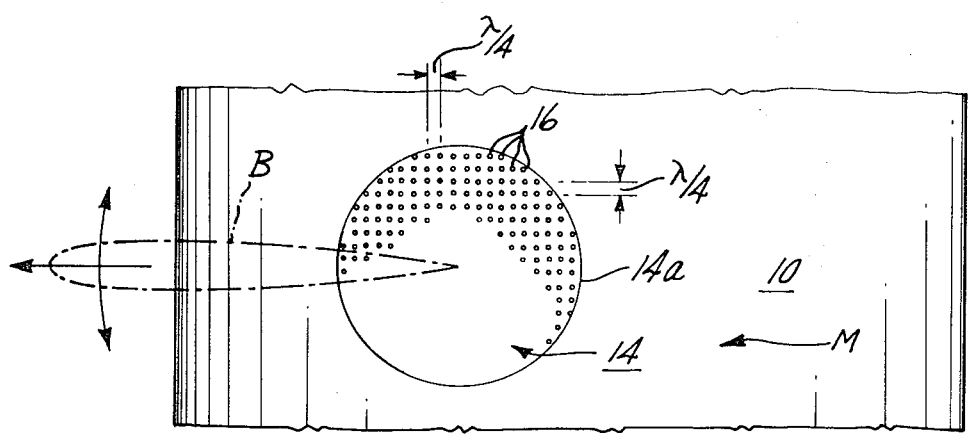
FIG. 2 is a fragmentary bottom view of the hydrofoil carrying the transducer array.

Referring to the drawings, the hydrofoil 10 of typical form, shown in FIGS. 1 and 2, has a substantially flat bottom surface 10a and a convex, lift-producing top surface 10b much like the configuration of a typical airfoil. A supporting strut 12 for the hydrofoil extends upwardly therefrom for connection to the hull of the vessel (not shown). This strut may be a separate member or may comprise an endwise extension of the hydrofoil turned upwardly to join the vessel's hull. The transducer array 14, comprising a large number of small thin disklike individual transducer elements 16, is preferably arranged to cover an area on the bottom surface of the hydrofoil within a circular outline 14a. These elements are arranged in orderly manner in substantially parallel rows which extend, for example, in the direction of travel shown by the arrow M and which are transverse to other parallel rows which extend, for example, at right angles to the direction of travel. Typically the array may be of the order of 11 wavelengths in diameter. The transducer elements in these rows are preferably spaced apart by approximately a quarter-wavelength at the frequency of sonar energy in water, so as to permit achieving an edge-fire beam pattern, i.e., generally horizontally directed principal axis of sensitivity in the preferred operating mode of the sonar. Such transducer elements are emplaced in a suitable supporting matrix protectively covered by a thin layer of electrically insulative material, such as an elastomer, having an acoustic impedance approximating that of water. In the matrix the elements are either backed by an air space or by a low-density material which is acoustically mismatched with the transducer material so as to avoid loss of energy through backside radiation. As mentioned, the transducer elements preferably lie substantially flush with the flat-bottom surface 10a of hydrofoil 10.

Separate electrical connections to the individual transducer elements 16 extend through a cabling system including conductors 18 in a protective cover 20 extending through the hydrofoil structure to associated electronic portions of the system in the vessel's hull. Alternatively, the electronic components may be mounted directly in the body of the hydrofoil itself, including energy transfer means, switching circuits, delay or phasing networks, etc., to be described. In miniaturized systems typical hydrofoils may accommodate the complete system with the exception of the indicator and control means, of course, which would be located abovedeck for direct accessibility.

It is to be emphasized that the invention lends itself to use of known electrical and acoustic techniques in the construction and operation of circuits and transducer elements. Typically, the transducer elements comprise disks of barium titanate, PZI4, or other piezoelectric material, the top and bottom surfaces of which are coated with silver or other electrically conductive material to which the electrical leads are soldered or otherwise secured. When these individual transducer elements are energized at appropriate electrical frequency, they are caused to expand and contract through the piezoelectric effect so as to produce ultrasonic vibrations or, in the event they are energized by incident ultrasonic energy, they in turn produce electrical oscillations of corresponding frequency in their connecting leads. The transducer elements may operate as receiving elements or as transmitting elements, or both. If simultaneously energized with coherent electrical energy at appropriate relative phasings, they cooperatively may be made to produce omnidirectional radiation in azimuth only or in both azimuth and elevation; alternatively, by revising the relative phasings of energization of the cooperating elements, a beam pattern may be formed which is narrow in both elevation and azimuth. After a transmitted pulse of energy is thus emitted from the array (or by a separate radiator, if desired), the transducer array is then placed in a receiving mode for a period of time in which echo signals to the maximum range limit desired are detected by their incidence upon the transducer elements. By connecting the transducer elements through electrical delay or phasing paths which differ in a known way in the amount of electrical delay or phasing for the different transducer elements, any desired direction of maximum sensitivity may be established, and by varying these connections in predetermined sequential manner, the sensitivity direction may be progressively shifted so as to scan a desired search region.

In FIGS. 1 and 2 the beam pattern B illustration approximates the shape of the radiation or reception sensitivity pattern produced by a circular array of some several hundred transducer elements relatively phased or delay connected in the associated energy transfer circuits so as to operate in an edge-fire mode. It will be noted that the pattern is relatively narrow in azimuth and wide in elevation, this being the pattern produced under conditions wherein substantially all transducer elements in the array are active simultaneously.

Figure 3:
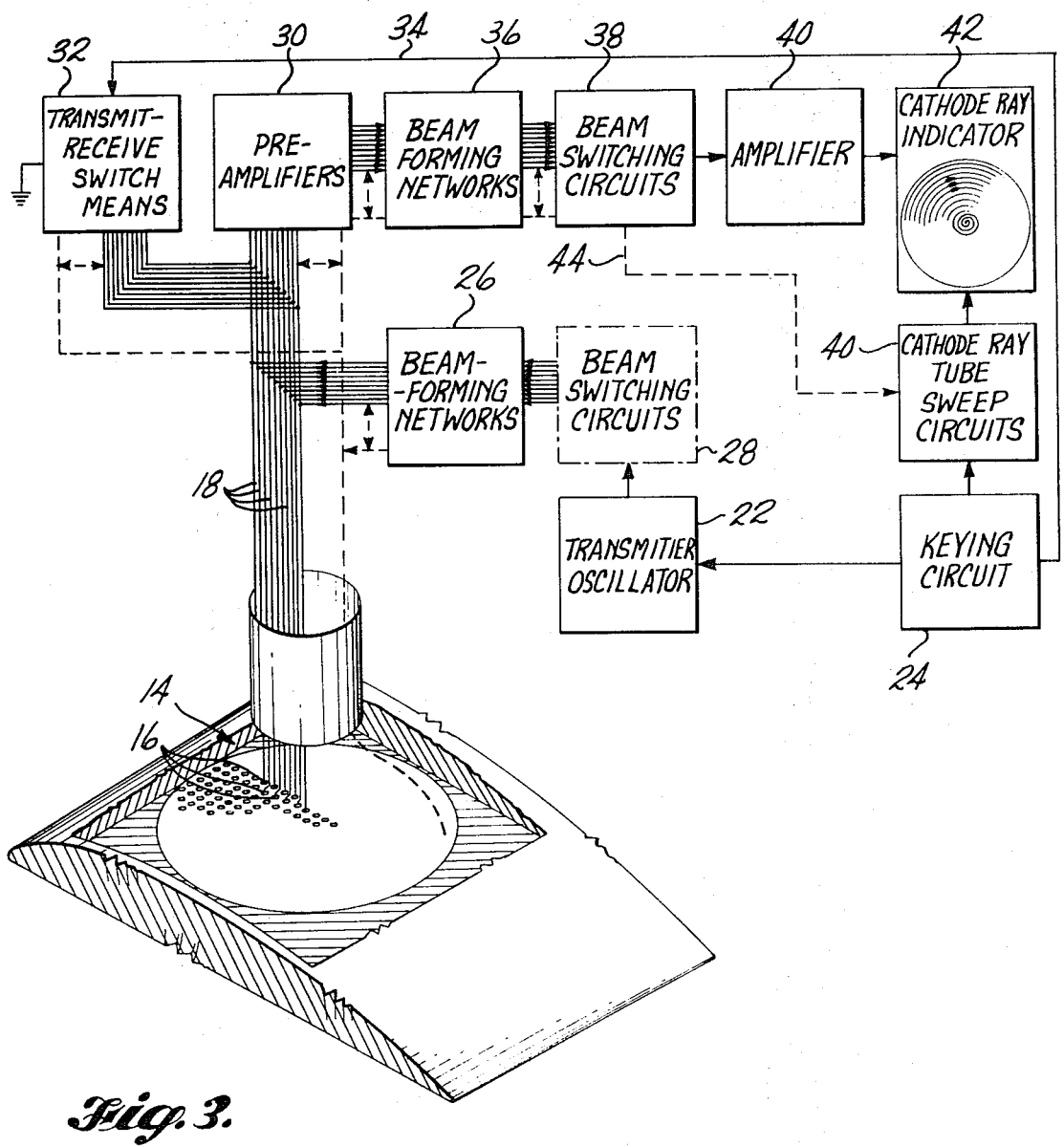
FIG. 3 is a block diagram, partially schematic, showing a typical sonar system in accordance with this invention.

Referring now to FIG. 3, a complete sonar system is shown in a simplified block diagram and partially schematic form. This system comprises the transducer array 14 which in the example is operated both as a transmitting and as a receiving array. Transmitted energy impulses at ultrasonic frequency are produced by a transmitter-oscillator 22 in response to periodic keying impulses produced by a synchronizer or keying circuit 24. Ultrasonic oscillations generated in the oscillator 22 may be applied directly to the beam-forming network 26 for application to the individual transducer elements 16 through the connecting leads 18. As shown, the relative phasings of the transducer elements are made to be the same during each transmitted energy impulse delivered by oscillator 22, so as to produce an omnidirectional transmission beam pattern. In such event target direction is determined by rapid angular scan of the surrounding area of a sector thereof through operation of the receiving circuits connected to the array elements during the receiving intervals as hereinafter described. Alternatively, as shown by broken lines, a beam-switching circuit 28 may be interposed between the oscillator 22 and the beam-forming network 26 so as to progressively vary the relative phasings of the electrical energy paths interconnecting the oscillator 22, as an energy transfer means, and the individual transducer elements 16. In this manner the direction of the transmitted energy beam axis may be caused to change from pulse to pulse. In the latter event typically the receiver channel in the system is provided with a similar beam-switching circuit such that the receiving direction or axis of sensitivity of the array corresponds from time to time with the transmission beam axis of the array.

As will be noted, conductors 18 extending from transducers 16 are connected not only to the output leads from the beam-forming network 26 but also to a plurality of inputs to the preamplifiers 30 in the receiving portion of the system. In order to protect the preamplifiers against excessive energization during the occurrence of the transmitted pulses applied to the transducers 16, the preamplifier inputs are protectively grounded or otherwise isolated from the output of beam-forming networks 26 by transmit-receive switch means 32, as in conventional practice. This transmit-receive switch is rendered operative by an appropriate impulse from keying circuit 24 through connecting lead 34, or it may be self-energizing as a result of the high level of energy occurring in the outputs of the beam-forming network 26 during pulse transmission. During pulse reception, however, electrical energy generated in the transducers 16 by incident sound energy at relatively low level is permitted to pass to the preamplifier inputs without interference from or attenuation by the transmit-receive switch means 32.

The outputs from the individual preamplifiers 30, corresponding in number to the number of transducer elements 16, are applied to the beam-forming network 36 usually through as many individual circuit paths as there are transducer elements, and from these to the beam-switching circuits 38 by which the energy contributions from the different circuit paths are combined for application to the amplifier 40 which energizes the cathode ray tube indicator 42 or other suitable indication device.

In the event beam-switching circuits 28 are used to progressively scan a narrow transmitted energy beam produced by transducer array 14, such circuits will be coordinated with the beam-switching circuits 28 so as to cause the receiving sensitivity pattern of the array to scan the search field of the sonar system synchronously with the transmitted beam. In such event, while not shown, a typical radar-type sector scan or plan position indicator may be employed with the system, wherein with each transmitted pulse a linear sweep of the cathode-ray tube electron beam is initiated along a line on the indicator screen corresponding to sonar beam direction, and the electron beam is intensified by the received echo signals so as to mark the distance to the reflecting object. Such techniques are well known in the art and require no separate description herein. Likewise, the function of the delay or phasing networks and the beam-switching circuits so as to select and interchange different paths between the energy transfer means and the individual transducer elements 16 through the different amounts of electrical delay represented in different portions of the beam-forming networks 26 and 36, respectively, are well known in the art and require no separate description herein.

In the system illustrated in FIG. 3, the output of amplifier 40 is applied to the intensification control grid of cathode-ray tube indicator 42. Cathode-ray tube sweep circuits 44, triggered by the keying circuit 26 synchronously with the operation of transmitter-oscillator 22, are arranged in known manner to produce a progressively increasing spiral scan of the cathode ray tube electron beam repeated with each transmitted energy pulse. This control of deflection of the cathode-ray tube beam is coordinated with the operation of the beam-switching circuits 38 during the receiving or listening interval of the system following each transmitted pulse. Such coordination is effected through a known type of connection means designated 44, so that during the electron beam spiral sweep rotations, the receiving sensitivity axis of the transducer array corresponds at any given instant with the angular position of rotation of the cathode-ray tube electron beam about the center of the cathode-ray tube. When an echo is received during the listening interval following a transmitted pulse, the cathode-ray tube beam is intensified so as to produce a bright spot or image on the screen of the tube at a position both in azimuth and in range which corresponds to the azimuth direction and the distance to the reflecting object producing the echo. This type of cathode-ray tube indication and this manner of controlling the sweep of a cathode-ray tube beam for purposes of sonar indication is known in the art and as such constitutes no part of this invention.

Figure 4:
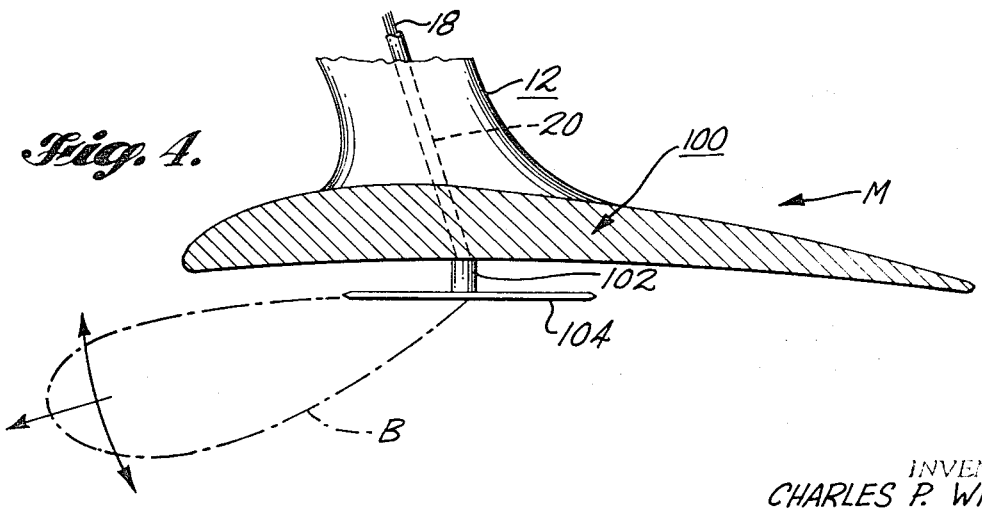
FIG. 4 is a side elevation view of a hydrofoil having an auxiliary sonar array support vane mounted thereon.

In the modification shown in FIG. 4, a hydrofoil 100 having a concave bottom surface and a convex top surface is provided with a depending small strut 102 which supports a relatively flat-bottom disk-shaped housing 104 adapted to support a coplanar multitransducer array similar to that shown in FIGS. 1 and 2. With this arrangement, it is possible to provide a relatively flat support surface for the transducer array without necessity for mounting it directly on the hydrofoil proper, and yet the array housing, because of its thin cross section presented in the direction of travel imposes virtually no drag on the vessel while being relatively uninfluenced by noise attending changes of pressure in the water as it moves across the curved lower surface of the hydrofoil.

Array phenomena and theoretical design considerations in the presentation and scanning of directional beams in transducer arrays are described in Chapter 5 of "Fundamentals of Sonar," J. W. Horton, United States Naval Institute, Annapolis, Md., 1957. Other system design considerations are also described in that text and in "Scanning Sonar Systems," Summary Technical Report of Division 6, NDRC Vol. 16, Washington, D.C., 1946. The latter reference (page 110 et seq.) describes the spiral sweep technique referred to herein and other system techniques which may be used in practicing the present invention (see especially Chapter 9).

The foregoing and other aspects of the invention will be apparent to those skilled in the sonar art based on the foregoing description of the presently preferred embodiments thereof.

I claim as my invention:

1. In a high-speed watercraft having an immersed generally horizontal bottom surface, a sonar system including an array of electroacoustic transducers mounted in substantially horizontal coplanar relationship imposed on an area of said surface, with said transducers emplaced in orderly arrangement of substantially parallel rows which extend transversely to other substantially parallel rows, and with the successive transducers in said rows being at approximately quarter-wavelength spacings, energy transfer means, and beam-forming circuit means operable to connect said individual transducers to said energy transfer means through predetermined different amounts of electrical delay so as to produce a directional pattern in the operation of said array, and to vary the amounts of delay so as to vary the angular direction of said pattern.

2. The combination defined in claim 1, wherein the beam-forming circuit means further includes selective switching means operable to interchange the connections of the individual transducers in such predetermined sequential manner as to progressively vary the angular direction of said pattern.

3. A hydrofoil craft including a hydrofoil having a substantially horizontal bottom surface with a sonar transducer array mounted substantially flush thereon, said array comprising substantially parallel rows of transducer elements arranged transversely to other substantially flush thereon, said array comprising substantially parallel rows of transducer elements arranged transversely to other substantially parallel rows of transducer elements, and circuit means including energy transfer means electrically connected to said transducer elements with different electrical phasings respectively and means operable to vary such phasings, so as to produce a directional edge-fire pattern in the operation of such array and so as to vary the azimuth angle of such pattern.

* * * * *